E. F. OLIVE.
HAME.
APPLICATION FILED DEC. 4, 1913.
1,103,998.
Patented July 21, 1914.
2 SHEETS—SHEET 1.
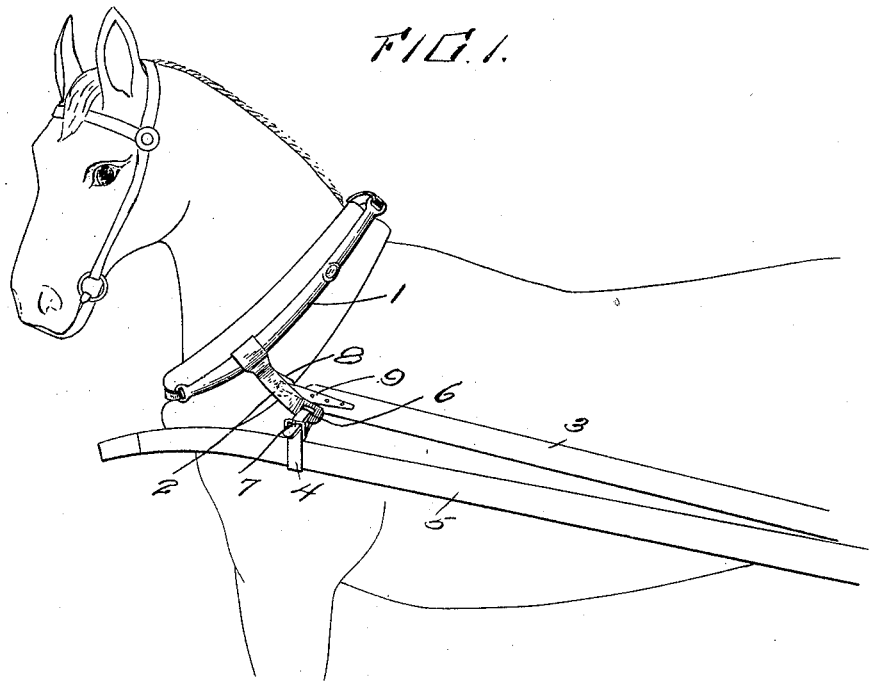
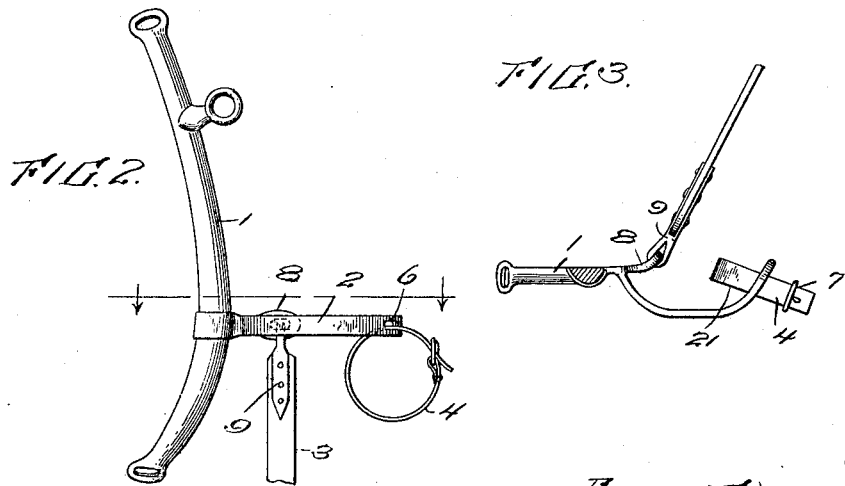
Witnesses
Inventor
Edwin Floyde Olive.
By
Attorney E. F. OLIVE.
HAME.
APPLICATION FILED DEC. 4, 1913.
1,103,998.
Patented July 21, 1914.
2 SHEETS—SHEET 2.
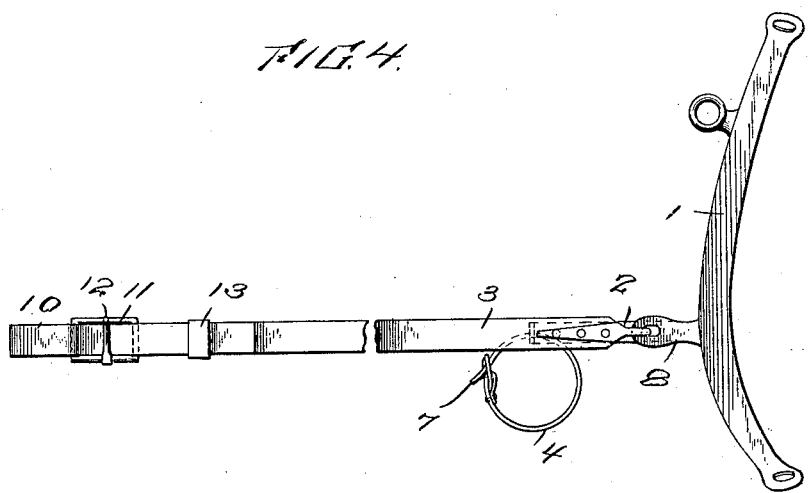
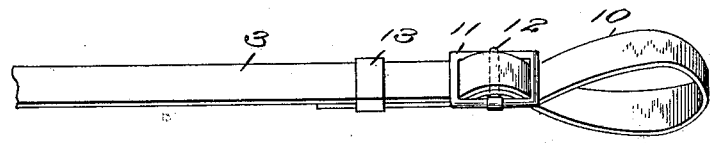
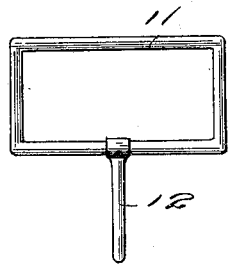
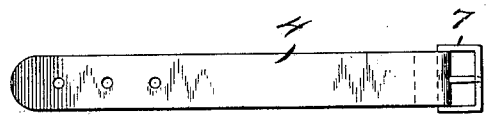
Inventor
Edwin Floyde Olive,
Witnesses
By
Attorney

UNITED STATES PATENT OFFICE.

EDWIN F. OLIVE, OF IRON CITY, TENNESSEE.

HAME.

1,103,998. Specification of Letters Patent. Patented July 21, 1914.

Application filed December 4, 1913. Serial No. 804,688.

*To all whom it may concern:*

Be it known that I, EDWIN F. OLIVE, a citizen of the United States, residing at Iron City, in the county of Lawrence and State of Tennessee, have invented certain new and useful Improvements in Harness Hames, of which the following is a specification.

This invention relates to improvements in hames, as used in connection with harness.

The invention has for its object to provide for suitably supporting and effecting connection between the vehicle shafts and the hame-sections, whereby the "pull-down" or weight will not be so great at that point as heretofore, and whereby the use of a saddle in effecting such connection is disposed of or obviated.

A further object is to provide for also effecting connection between the shaft-loop attaching member of the hames and the trace or tug; also to provide for certain other facilities and advantages as will later appear.

The invention therefore consists of certain instrumentalities and features substantially as hereinafter fully disclosed and defined by the appended claims.

In the accompanying drawing is illustrated the preferred embodiment of my invention wherein it will be understood the various changes and modifications as to the detailed construction and arrangement of parts may be made without departing from the spirit of the invention and in which drawing—

Figure 1 is a perspective view of my invention as applied for use in connection with hames and a shaft or thill. Fig. 2 is a side view of the same and a hame-section. Fig. 3 is a horizontal section taken on the line $x$—$x$ of Fig. 2. Fig. 4 is an opposite side view of my invention. Fig. 5 is a fragmental perspective view showing a strap or trace as looped to receive a whiffletree hook or end. Fig. 6 is a side view of a shaft-loop forming strap and Fig. 7 is a like view of a buckle employed in effecting the looping of said strap.

In carrying out my invention, I provide or weld upon a hame section or member 1, an arm or what becomes an extension 2 thereof at the point corresponding to the usual point of attachment for the trace or tug 3, the hame-section or sections being preferably of steel upon which the welding of the trace or tug attaching member or extension is effected. The arm, member or extension 2 is caused to suitably outstand from the hame-section or member 1 being preferably curved or bowed to cause its outer or free end to occupy a position suitable for the attachment thereto or suspending therefrom a loop 4 formed by a strap for receiving the shaft or thill 5 as clearly seen in Figs. 1 and 4, an opening or slot 6 being provided in said arm or extension to receive said strap, the ends of said strap being suitably buckled together, as at 7, the advantages of which arrangement of parts will be stated later. The arm or member 2 has an apertured branch or adjunctive member 8 which provides for effecting connection therewith of the tug or trace 3 preferably by means of an eye-ended metal member or casting 9 riveted to the trace or tug, this casting, however, together with the riveting or particular manner of connecting the trace to the branch of the member 2 only being incidental or subsidiary matters, therefore not constituting an essential feature of the invention, as will be appreciated. The inner end of the trace or tug 3 is looped, as at 10, to suitably effect connection there-between and the whiffletree-hook or stud (not shown) the loop being preferably formed by returning the end of the trace or tug upon itself and passing the resultant doubled portion thereof through the frame of a buckle 11, the tongue 12 of the latter being passed under said doubled portion of the trace. The free end of the trace or tug is inserted or passed through a slide or frame 13 carried by the latter, it thus being secured in place against casual movement.

From the foregoing, it will be seen that my invention is capable of holding the shaft or thill against the possibility of pulling out of the same when in use, and yet allow of the shaft being readily slid or withdrawn therefrom in detaching the tug or trace from the shaft; the use of a saddle is obviated while there is not so much weight or "pull-down" upon the shaft as in the use of a saddle; also the general construction of parts are such that the device is simple, inexpensive of manufacture and readily applied, and of few parts.

I claim—

1. A device of the type described including a hame-member having an outstanding arm, itself having a branch, said arm having suspended therefrom a loop adapted to receive a shaft or thill, said branch being adapted to provide for the attachment thereto of a trace or tug.

2. A device of the type described including a hame-member having an outstanding arm and a shaft receiving loop suspending therefrom, said arm having a trace receiving branch off-set therefrom, the outer terminals of said arm and branch being opposed to each other and extending in the same general direction.

In testimony whereof I affix my signature in presence of two witnesses.

EDWIN F. OLIVE.

Witnesses:
PAUL S. SEAVY,
V. F. REYNOLDS.

Copies of this patent may be obtained for five cents each, by addressing the "Commissioner of Patents, Washington, D. C."